United States Patent [19]
Earl

[11] 3,964,698
[45] June 22, 1976

[54] AIR CUSHION TYPE UNDERCARRIAGE FOR AIRCRAFT

[75] Inventor: T. Desmond Earl, Buffalo, N.Y.

[73] Assignee: Textron, Inc., Providence, R.I.

[22] Filed: June 5, 1974

[21] Appl. No.: 476,387

[52] U.S. Cl. ............................ 244/100 A; 152/370; 180/128; 220/DIG. 19
[51] Int. Cl.² .......................................... B64C 25/56
[58] Field of Search ............. 220/DIG. 19; 180/116, 180/124, 127, 128, 119; 244/100 R, 102 R, 12 R, 100 A, 105, 23 R; 152/370; 114/67 A

[56] References Cited
UNITED STATES PATENTS

| | | | |
|---|---|---|---|
| 496,359 | 4/1893 | Hamman | 152/370 |
| 670,794 | 3/1901 | Lott | 220/DIG. 19 UX |
| 821,041 | 5/1906 | Kinney | 152/370 |
| 1,453,485 | 5/1923 | Vosburgh | 220/DIG. 19UX |
| 2,095,931 | 10/1937 | Kraft | 152/370 |
| 3,013,454 | 12/1961 | Gruber | 152/370 |
| 3,379,271 | 4/1968 | Hopkins et al. | 180/128 |
| 3,414,077 | 12/1968 | Earl | 244/100 R X |
| 3,469,650 | 9/1969 | Hardy et al. | 180/128 |
| 3,524,517 | 8/1970 | LaFleur | 180/124 |
| 3,610,364 | 10/1971 | Snoeyenbos | 180/124 |

Primary Examiner—Trygve M. Blix
Assistant Examiner—Galen L. Barefoot
Attorney, Agent, or Firm—Bean & Bean

[57] ABSTRACT

The inflatable cell portion(s) of an air cushion type undercarriage for airplanes, air cushion vehicles, or the like, of the type which are formed with air outlet openings in the ground tangent areas thereof are individually provided with air flow control devices having highly abrasive tear-resistant bottom surfaces disposed externally of the cell fabric, in lieu of the conventionally employed coverply or "wear strips". The devices of the present invention receive the ground contact abrasion and tear-inducing stresses normally imposed upon the cell fabric, and protect the latter in improved manner; and are simply snap-fitted (and thereby detachably locked) into the cell fabric apertures, and may be easily replaced as required.

9 Claims, 13 Drawing Figures

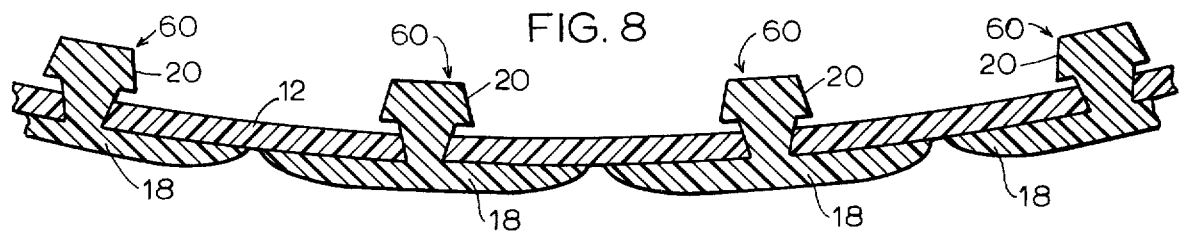
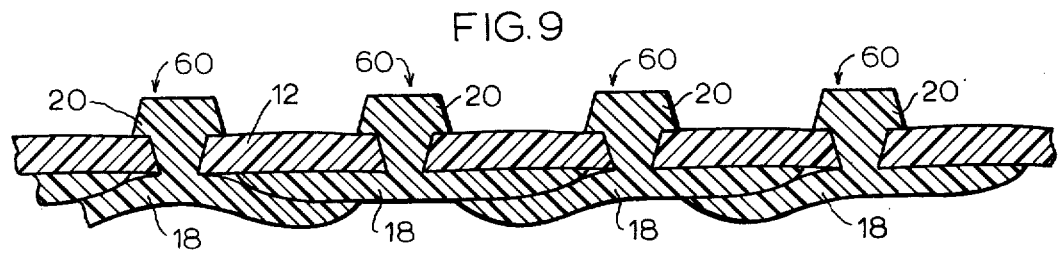
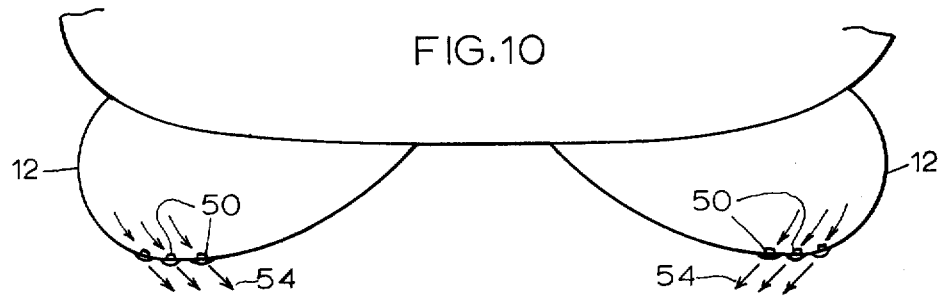
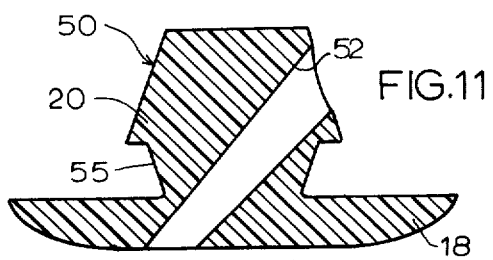
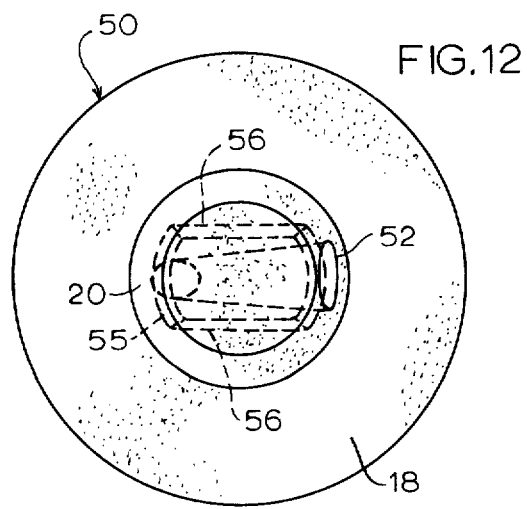
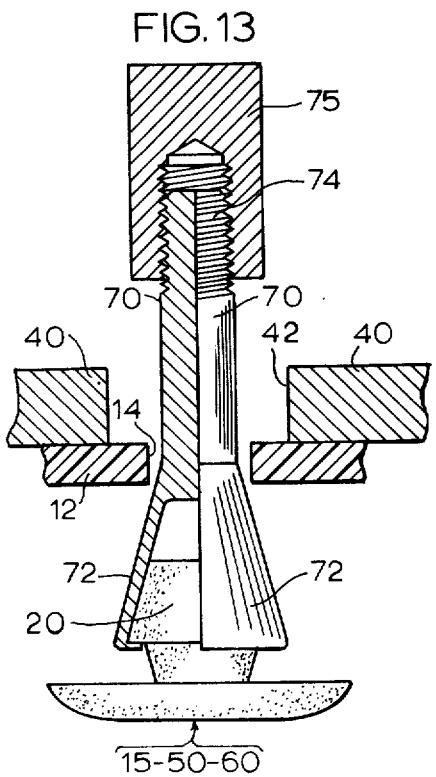

AIR CUSHION TYPE UNDERCARRIAGE FOR AIRCRAFT

BACKGROUND OF THE INVENTION

The present invention relates to air cushion type undercarriage devices such as are discussed and disclosed for example in my earlier U.S. Pat. Nos. Re. 26,812; 3,690,401 and 3,738,597; and more specifically relates to the problem of reducing the wear and tear rates of the apertured ground-tangent portions thereof. Previously, it has been proposed to alleviate the aforesaid problem by armoring the wear and tear recipient regions of the trunk fabrication such as with metal grommets or "overply" tread layers of similar material fabrications of substantial thicknesses and of compatible elasticity characteristics. However, such prior systems have been found to be inherently vulnerable to severe propagations of trunk fabric tear/cut stresses extending throughout the structures, especially within the relatively stiffer and thicker overply layers thereof. Such troubles as delamination, interply bond failure, and surface cut propagations develop to intolerable degrees, especially in the regions of the maximum strain areas of the trunk construction. In any case ground tangent surface wear is also a key factor in trunk life, especially whenever the vehicle is operative relative to concrete runways and the like.

BRIEF SUMMARY OF THE INVENTION

According to the present invention the ground tangent apertured areas of an inflatable air cushion confining trunk or cell structure as referred to hereinabove are individually equipped with abrasion/tear-resistant spool devices which are slip-fitted and snap-locked into the apertures through the cell fabric so as to protrude at their outer ends therebelow. Hence the spools per se receive the major wear and tear strains incident to landing surface contacts, and dissipate the accompanying fabrication stresses throughout the structure in an improved manner.

DESCRIPTION OF THE INVENTION

The invention is illustrated by way of example by means of the accompanying drawing wherein:

THE DRAWING

Figure 1:
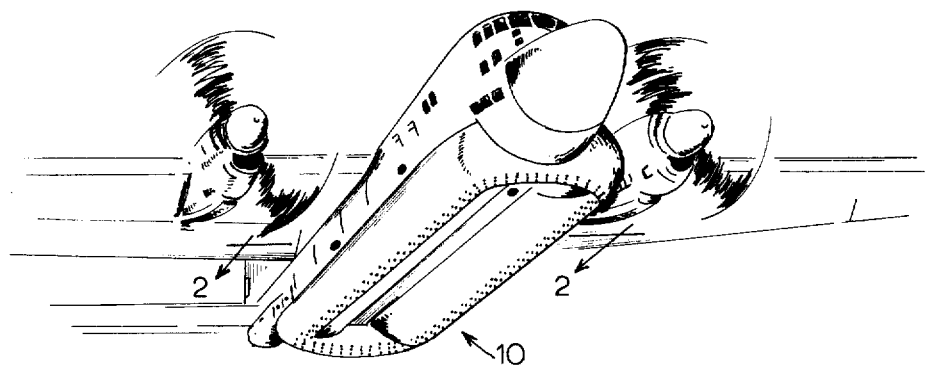
FIG. 1 is a front-bottom perspective view of an airplane equipped with an air cushion type undercarriage structure of the present invention.
Figure 2:
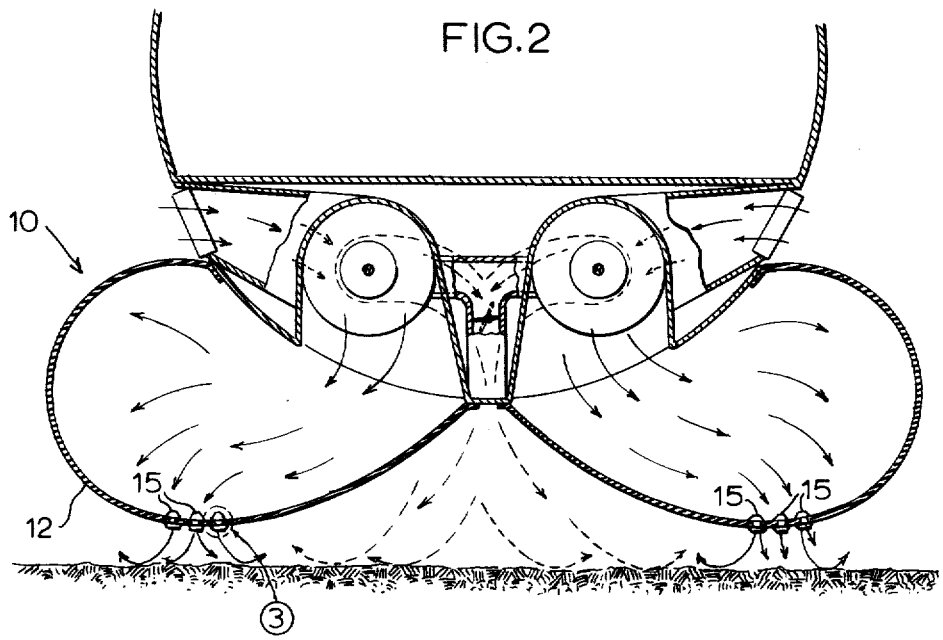
FIG. 2 is an enlarged scale fragmentary sectional view taken as suggested by line 2—2 of FIG. 1.
Figure 3:
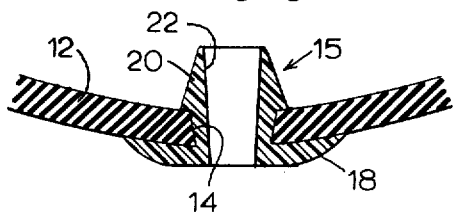
FIG. 3 is an enlarged scale fragmentary sectional view taken as suggested by the designating numeral 3 at FIG. 2.
Figure 5:
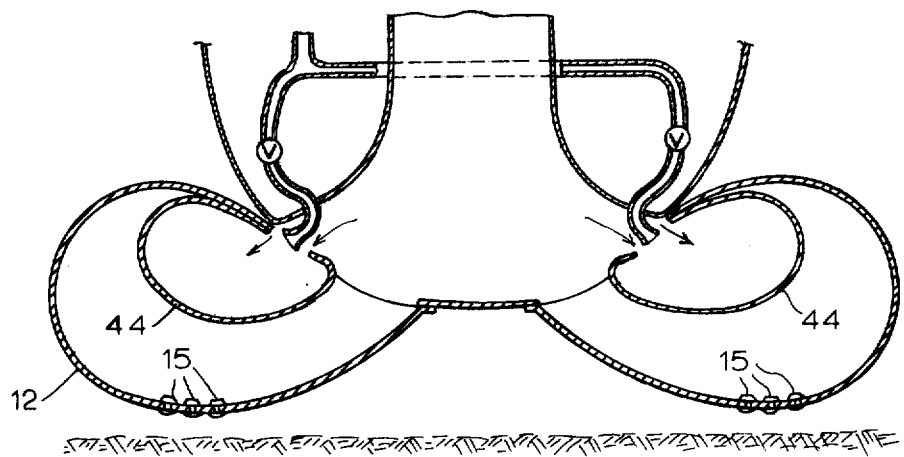
Figure 6:
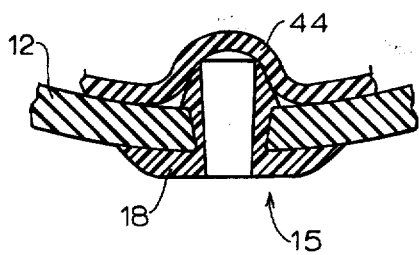
Figure 7:
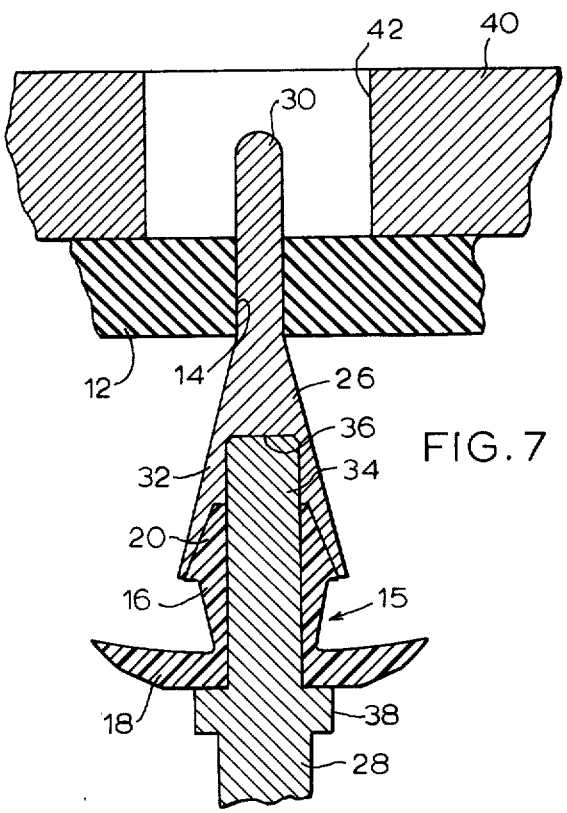

FIG. 5 is a view corresponding to FIG. 2 but illustrating application of the invention to a form of air cushion support trunk system such as shown in U.S. Pat. No. 3,738,597;

FIG. 6 is an enlarged scale fragmentary sectional view illustrating how the internal bladder member of FIG. 5 seals the air outlet spool when the bladder is inflated;

FIG. 7 is a fragmentary sectional view illustrating operation of a special tool for inserting the spools of the invention through apertured portions of the trunk fabrication;

FIG. 8 is a sectional view similar to FIGS. 3, 6, but illustrates use of solid "plug" type of trunk aperture inserts; the trunk fabrication sheet material being shown in inflated (elastically extended) condition;

FIG. 9 corresponds to FIG. 8 but illustrates the same assembly when the trunk fabrication is deflated and elastically contracted, whereby the bottom pads of the plug devices operate to armor-plate the wearing surface of the trunk fabric;

FIG. 10 is a view corresponding to FIGS. 2, 5, but illustrates a modified form of jet directional control, attained by use of still another modified form of spool device;

FIG. 11 is an enlarged scale sectional view through one of the spool devices shown in FIG. 10;

FIG. 12 is a bottom plane view of the spool device of FIG. 11; and

FIG. 13 corresponds to FIG. 7 but illustrates use of another form of tool device for assembling the spool or plug devices relative to the trunk fabric apertures.

Figure 4:
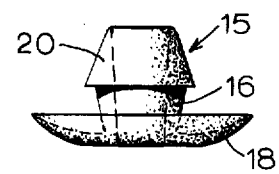
FIG. 4 is a side elevational view of a typical spool device, in accordance with the invention.

As shown by way of example at FIGS. 1–4 herein, the invention is employed in connection with an air cushion type undercarriage comprising a toroidal-shaped inflatable trunk such as designated generally at 10, and such as is more fully described in the above referenced U.S. Pat. Nos. Re. 26,812 and 3,690,401. As disclosed in U.S. Pat. Nos. 3,690,401 at 24, the apertures provided along the footprint surfaces of the trunk system may be of various numbers and sizes. However, in the case of the present invention the air outlet apertures 14 through the trunk fabric are provided to be of circular form and are sized so as to receive in elastically pressfitted relation therein the special spools of the present invention such as are designated generally at 15 and which are best shown in detail at FIGS. 3, 4. The spools 15 may be formed of any suitable abrasion-tear-resistant material such as to be molded from a relatively tough plastic material such as Polyurethane, Neoprene or the like; or, they may be fabricated of a suitable metal alloy or ceramics or any other suitable natural or synthetic material having the proper wear/tear resistant properties. In any case, as shown at FIGS. 3, 4, each spool comprises a generally cylindrical shaped stem or body portion 16 which is subtended at one end by a plate-shaped wearing pad portion 18 and which terminates at its opposite end with a spear-shaped head portion 20; the entire unit being formed with a centrally located bore 22.

FIG. 7 of the drawing herewith illustrates a preferred method for inserting the spools 15 through the preapertured portions 14 of the trunk fabric 12. As illustrated therein, a two-part tool comprising a spear-shaped member 26 and a pusher-member 28 is employed to facilitate insertions of the spools through the trunk fabric apertures. Note that the head portion 26 of the tool has a reduced size leading end portion 30 adapted to be easily slip-fitted through the apertured portion 14 of the fabric, and is subtended by a conically-shaped increasing diameter cover portion 32 which "umbrellas" at its lower end over the head portion 20 of the spool to be inserted.

The pusher portion of the tool 28 includes a leading end portion 34 which slip-fits through the bore 22 of the spool 15 and thereupon "bottoms" at its upper end against a counter-bored portion 36 of the tool head 26. The pusher 28 also includes an enlarged diameter collar portion 38 which is shaped to bear against the bottom portion 18 of the spool 15 when the tool device is assembled relative to the spool as illustrated at FIG. 7. Thus, it will be appreciated that the assembly as shown at FIG. 7 may be readily press-fitted through the trunk fabric aperture 14 by first inserting the head portion 30 of the tool through the fabric aperture and then driving the tool so as to force the umbrella portion 32 of the tool through the fabric aperture so as to dispose the neck portion 16 of the spool within the fabric aperture. The two tool parts are then simply withdrawn (in opposite directions) so as to leave the spool in the aperture as illustrated at FIG. 3. As illustrated at 40, FIG. 7, a backing plate is preferably employed when punching the spool carrying tool through the fabrication; the backing plate 40 being formed with an aperture 42 to accommodate passage of the tool through the plate.

FIGS. 5, 6, illustrate application of spools 15 to an air cushion undercarriage trunk system of the type employing an internal bladder as illustrated at 44; the purpose and construction and operation of such a bladder system being explained in detail in the above reference U.S. Pat. No. 3,738,597. FIG. 6 illustrates how the bladder 44 is adapted, when inflated, to cover and seal off the central bore portions of the spools 15 so as to prevent escape of air from internally of the trunk system 10, as explained in detail in the aforesaid patent.

Note that as best illustrated at FIGS. 3, 6, the bore through the spool 15 is of tapered diameter form; being smaller at the discharge end of the spool. This insures that the air jet issuing from the spool will be uniformly at the prescribed full flow rate. Also note that the outer surface of the neck portion 16 of the spool is cylindrically tapered; being of smaller diameter at its juncture with the pad portion 18. This insures that when the trunk fabrication is in service and stretches and thus out when inflated, the spool will automatically tend to ride into the fabrication so as to always press-fit the bottom plate 18 of the spool against the outer surface of the fabric. This prevents accumulation of foreign materials such as runway dirt/dust or the like in-between the plate portion 18 and the trunk fabrication.

A modified form of the invention is illustrated in FIGS. 10, 11 and 12 herewith to provide for directing the jets of air issuing from the trunk through the spools to be canted inwardly relative to the air cushion cavity under the vehicle. Thus, as best shown in FIGS. 11, 12, the spools as designated 50 are generally formed similar to the spools 15 as shown in FIGS. 2–7, except that in the case of the spools 50 the air exit bores 52 therethrough are canted or inclined relative to the vertical axes of the spools. Thus, when the spools 50 are installed in the apertured portions of the trunk 12 they may be disposed so that the exhaust air jets therethrough inwardly toward the center of the air cushion cavity under the vehicle, such as is illustrated by the directional flow arrows 54 (FIG. 10).

In order to maintain the spools 50 against rotation and in properly oriented positions for this purpose the trunk engaging neck portions 55 of the plugs are key-shaped such as being flattened at opposite sides thereof as indicated at 56, 56, (FIG. 12), and the apertures through the fabrication of the trunk device 12 are similarly shaped so as to lock the spools when inserted against rotation out of their intended orientations. It has been determined that by so directing the exhaust air jets to enter the air cavity space below the vehicle at for example approximately 45° angles of inclination, the effective air cushion height attainable by the vehicle relative to the reaction surface may be increased by a factor of approximately 1.7; assuming that the other trunk structure and operating parameters such as orifice diameters, air pressure, and flow rates are the same, compared to the use of strictly vertically downwardly directed jet orifices.

FIGS. 8 and 9 illustrate another form of device of the invention as indicated generally at 60; comprising a solid plug generally similar in external form to the spools 15 and 50 as shown in FIGS. 3 and 11. However, in the case of FIGS. 8, 9, the plugs are solid and include no air escape bores therethrough. Thus, these plugs 60 may be advantageously fabricated along with the initial processes of making the spools 15, 50, and supplied as a standard item to be selectively employed in combination with spools such as shown in FIGS. 3 and 11, thereby facilitating the patterning of the trunk system to any desired operational requirement. For example, assuming the trunk 12 to have been previously perforated in standard fashion to include more apertures than are required in connection with a specific installation, plugs of the type illustrated at 60 may be selectively mounted in certain of the preformed apertures of the trunk fabric so as to reduce the number of effective air jet apertures.

In any case, when such plugs are employed they will operate to "armor plate" the ground contacting surface of the trunk fabric against wear and tear. FIG. 8 illustrates an armored section of trunk fabric when in its inflated (expanded) condition. Note that the trunk fabric is elastically stretched and thinned so that the pad portions 18 of the plugs rest flatly against the trunk fabric. However, the plugs may be so located that when the trunk is deflated and in fabric-relaxed condition, the plate portions 18 of the plugs will move into relatively shingled relation, as shown at FIG. 9; thereby conserving space and enabling the desired numer of plugs to be installed within a given trunk fabric section.

FIG. 13 illustrates another form of spool or plug inserting tool which is adapted to grip about the spool or plug head portion 20 as shown in FIG. 13. The tool comprises a two-piece sleeve-like device comprising two semi-cylindrical body parts 70—70, each subtended by a flaring skirt portion as illustrated at 72—72. At their upper ends the body portions 70—70 are externally threaded as shown at 74 so as to be screw-thread accommodated such as within an internally threaded handle portion 75. Thus, it will be appreciated that (as viewed in FIG. 13) the tool parts 70—70 may first be placed about the head of the spool or plug and then thrust upwardly through the apertured portion 14 of the trunk fabric 12 while the latter is retained by the mandrel 40. Then, from the other side of the fabrication the handle 75 may be screwed down over the tool portions 70—70 and into the assembled relation as shown at FIG. 13. The handle 75 is then pulled upon the draw the flared portion of the tool through the opening in the fabric 12, whereupon the latter resiliently retracts so as to closely grip upon the reduced neck portion 55 of the spool (or plug). Thus, the spool (or plug) is firmly locked in operative position, and the handle portion 75 of the tool is then unscrewed so as to release the tool parts 70—72 from the spool (or plug).

I claim:

1. A device adapted to be inserted within an aperture opening through the footprint surface of an air inflated cell forming a part of an air cushion type undercarriage, said cell being formed at least adjacent said aperture of an elastic material, said device comprising:

a spool shaped body including a reduced size intermediate neck portion capped at one end by an enlarged head portion and subtended at its other end by an enlarged diameter wearing portion, said neck portion being tapered with its sectional measurement being smaller at its juncture with said wearing portion than at its juncture with said head portion, said head portion being shaped and sized so as to be adapted to be pressured inwardly through said aperture while elastically deforming said elastic material until said head portion passes through said elastic material into said cell while said wearing portion remains externally thereof, whereupon said elastic material elastically contracts around said neck portion and locks said body in an operative position whereat said wearing portion armors said elastic material against wear, said body being formed with an air jet outlet bore extending through said head and neck and wearing portions, and said bore being canted out of axial alignment with said head and neck and wearing portions obliquely to direct air jets issuing through a discharge end thereof extending through said wearing portion.

2. A device according to claim 1, wherein said neck portion is key-shaped to restrain said body from rotation within said aperture.

3. A device according to claim 2, wherein said bore is of tapered diameter form, being smallest adjacent said discharge end.

4. A device adapted to be inserted within an aperture opening through the footprint surface of an air inflated cell forming a part of an air cushion type undercarriage, said cell being formed at least adjacent said aperture of an elastic material, said device comprising:

a spool shaped body formed of an abrasion/tear-resistant material and including a reduced size intermediate neck portion capped at one end by an enlarged head portion and subtended at its other end by an enlarged diameter wearing portion, said body being formed with an air jet outlet bore extending therethrough and being canted out of axial alignment with said head and neck and wearing portions, whereby to be adapted to obliquely direct air jets issuing from said bore through said wearing portion, said neck portion being of a key-shaped sectional configuration, said head portion being shaped and sized so as to be adapted to be pressured inwardly through said aperture while elastically deforming said elastic material until said head portion passes into said cell while said wearing portion remains externally thereof, whereupon said material elastically contracts around said neck portion for locking said body in an operative position wherein said wearing portion armors said material against wear and for constraining said body from rotating within said aperture.

5. An air cushion undercarriage for supporting a vehicle relative to a reaction surface, said undercarriage comprising in combination:

an air inflatable cell fabricated of an elastic material, said cell having a footprint surface formed with a plurality of apertures opening therethrough wherein at least certain of said apertures are arranged such that adjacent apertures are spaced apart one distance when said material is in a relatively relaxed condition incident to said cell being deflated and are spaced apart another distance when said material is relatively extended incident to said cell being inflated, said other distance exceeding said one distance; and a plurality of footprint surface armoring devices inserted one through each of said certain apertures, each of said devices comprising a spool shaped body including a reduced size intermediate neck portion capped at one end by an enlarged head portion and subtended at its other end by an enlarged diameter wearing portion, said head portion being shaped and sized so as to be adapted to be pressured inwardly through its associated one of said certain apertures while elastically deforming said elastic material until said head portion passes through said elastic material into said cell while said wearing portion remains externally thereof, whereupon said elastic material elastically contracts around said neck portion and locks said body in an operative position wherein said wearing portion armors said footprint surface against wear, and said devices inserted through said adjacent apertures having the wearing portion thereof of a size which is greater than said one distance but less than said other distance to reside flatwise against said footprint surface when said cell is inflated and to reside in a shingled relationship relative to one another when said cell is deflated.

6. An air cushion undercarriage according to claim 5, wherein said neck portion of each of said devices associated with said certain apertures is tapered with its sectional measurement being smaller at its juncture with said wearing portion than at its juncture with said head portion.

7. An air cushion undercarriage according to claim 6, wherein other devices having a body essentially corresponding in shape to said devices are inserted one through each of said apertures other than said certain apertures, and said other devices differing from said devices by being formed with an air jet outlet bore extending through said head and neck and wearing portions thereof.

8. An air cushion undercarriage for supporting a vehicle relative to a reaction surface and comprising, in combination:

an air inflatable cell fabricated from elastic material and adapted to be inflated from a relaxed condition to an inflated, stretched condition circumscribing an air cushion space and presenting a footprint area around said air cushion space which may contact and scrub against the reaction surface, said cell having a pattern of openings in said footprint area at least some of which are adapted to discharge jets of air from internally of the cell to supply superatmospheric air to said air cushion space; and a plurality of protective devices positioned in at least certain of said openings throughout said footprint area to protect said cell from damage due to scrubbing against said reaction surface, each such device comprising a body having an intermediate neck portion slidably received in an opening and capped at one end by an enlarged head portion and subtended at its other end by an enlarged diameter wearing portion, said head portion and said wearing portion presenting mutually opposed substantially flat surfaces surrounding said neck portion which are in face-to-face contact with the inner and outer surfaces of said cell surrounding an opening therein when the cell is in relaxed condition, and said neck portion tapering inwardly from said flat surface of the head portion to said flat surface of the wearing portion to produce a wedging action which causes said neck portion to slide within an opening and maintain said flat surfacee of the wearing portion in intimate contact with said outer surface of the cell when said cell is stretched thinner due to inflation thereof.

9. An aiar cushion undercarriage as defined in claim 8 wherein said protective devices are provided with air jet bores therethrough.

* * * * *